(12) United States Patent
Rowley et al.

(10) Patent No.: US 8,980,161 B2
(45) Date of Patent: *Mar. 17, 2015

(54) METHOD FOR MAKING A RESERVOIR

(75) Inventors: William W. Rowley, Chagrin Falls, OH (US); Grandin A. Rushlander, Mantua, OH (US); Robert Yunk, Mantua, OH (US); Earl Christian, Jr., Warren, OH (US)

(73) Assignee: Mercury Plastics, Inc., Middlefield, OH (US)

( * ) Notice: Subject to any disclaimer, the term of this patent is extended or adjusted under 35 U.S.C. 154(b) by 331 days.

This patent is subject to a terminal disclaimer.

(21) Appl. No.: 13/529,778

(22) Filed: Jun. 21, 2012

(65) Prior Publication Data

US 2013/0256955 A1 Oct. 3, 2013

Related U.S. Application Data

(63) Continuation-in-part of application No. 12/967,567, filed on Dec. 14, 2010, now Pat. No. 8,431,067, which is a continuation-in-part of application No. 11/682,477, filed on Mar. 6, 2007, now Pat. No. 7,850,898.

(51) Int. Cl.
  *B29C 49/04* (2006.01)
  *B29C 49/20* (2006.01)
  *B29C 35/08* (2006.01)
  (Continued)

(52) U.S. Cl.
  CPC ................ *B29C 49/20* (2013.01); *B29C 49/04* (2013.01); *B29C 2035/0877* (2013.01); *B29C 2049/023* (2013.01); *B29C 2049/2047* (2013.01); *B29C 2791/001* (2013.01); *B29C 2791/006* (2013.01); *B29C 2791/007* (2013.01); *B29K 2023/00* (2013.01); *B29K 2023/06* (2013.01); *B29K 2027/06* (2013.01); *B29K 2067/003* (2013.01); *B29K 2075/00* (2013.01); *B29K 2077/00* (2013.01); *B29K 2105/243* (2013.01); *B29L 2023/004* (2013.01); *B29L 2031/7172* (2013.01); *B29L 2031/7622* (2013.01)
  USPC ........... 264/514; 264/516; 264/524; 264/552; 264/573; 264/453; 264/459

(58) Field of Classification Search
  None
  See application file for complete search history.

(56) References Cited

U.S. PATENT DOCUMENTS 1,692,223 A 10/1926 Pinkerton et al.
2,477,210 A 7/1949 Skinner
(Continued)

FOREIGN PATENT DOCUMENTS

JP 06270932 A 9/1994

OTHER PUBLICATIONS

RepairClinic.com Water Reservoir Kit, 1999.
(Continued)

*Primary Examiner* — Monica Huson
(74) *Attorney, Agent, or Firm* — Hahn Loeser & Parks, LLP

(57) ABSTRACT

A process for making a reservoir including steps of positioning a hollow extrudate at an elevated temperature in a mold cavity, inserting a fitting into an end of the extrudate, sealing an outer surface of the fitting with an interior surface of the extrudate using latent heat within the extrudate, and forming at least a portion of the extrudate against the mold cavity forming a reservoir with the fitting sealed into the reservoir.

20 Claims, 12 Drawing Sheets

(51) Int. Cl.

| | |
|---|---|
| B29C 49/02 | (2006.01) |
| B29K 23/00 | (2006.01) |
| B29K 27/06 | (2006.01) |
| B29K 67/00 | (2006.01) |
| B29K 75/00 | (2006.01) |
| B29K 77/00 | (2006.01) |
| B29K 105/24 | (2006.01) |
| B29L 23/00 | (2006.01) |
| B29L 31/00 | (2006.01) |

(56) References Cited

U.S. PATENT DOCUMENTS

| | | |
|---|---|---|
| 2,787,131 A | 4/1957 | Wurtz |
| 2,788,642 A | 4/1957 | Burkhead et al. |
| 3,429,140 A | 2/1969 | White |
| 3,511,415 A | 5/1970 | Crowe |
| 3,834,178 A | 9/1974 | Pink |
| 3,982,406 A | 9/1976 | Hanson et al. |
| 4,213,933 A | 7/1980 | Cambio |
| 4,313,904 A | 2/1982 | Larkin et al. |
| 4,335,746 A | 6/1982 | Miyahara et al. |
| 4,680,071 A | 7/1987 | Candle |
| 4,739,629 A | 4/1988 | True |
| 5,315,845 A | 5/1994 | Lee |
| 5,542,264 A | 8/1996 | Hortin et al. |
| 5,640,994 A | 6/1997 | Jacobsen |
| 6,079,221 A | 6/2000 | Senner |
| 6,627,136 B2 | 9/2003 | Frey, Jr. |
| 6,810,682 B1 | 11/2004 | Schuchart |
| 7,850,898 B1 * | 12/2010 | Rowley et al. ................. 264/514 |
| 8,431,067 B2 * | 4/2013 | Rowley et al. ................. 264/514 |
| 2006/0180959 A1 | 8/2006 | McClung |

OTHER PUBLICATIONS

RepairClinic.com In-Refridgerator Water Supply Reservoir With Tubes, 1999.
RepairClinic.com In-Refridgerator Water Supply Reservoir With Tubes and Connection Fittings, 1999.
RepairClinic.com Water Tank With Tubing, 2005.
RepairClinic.com Water Tank With Tubing and Couplers, 1999.
RepairClinic.com Water Tank Kit, 1999.
Great Britain International Search Report, Dec. 10, 2013.

* cited by examiner

Prior Art

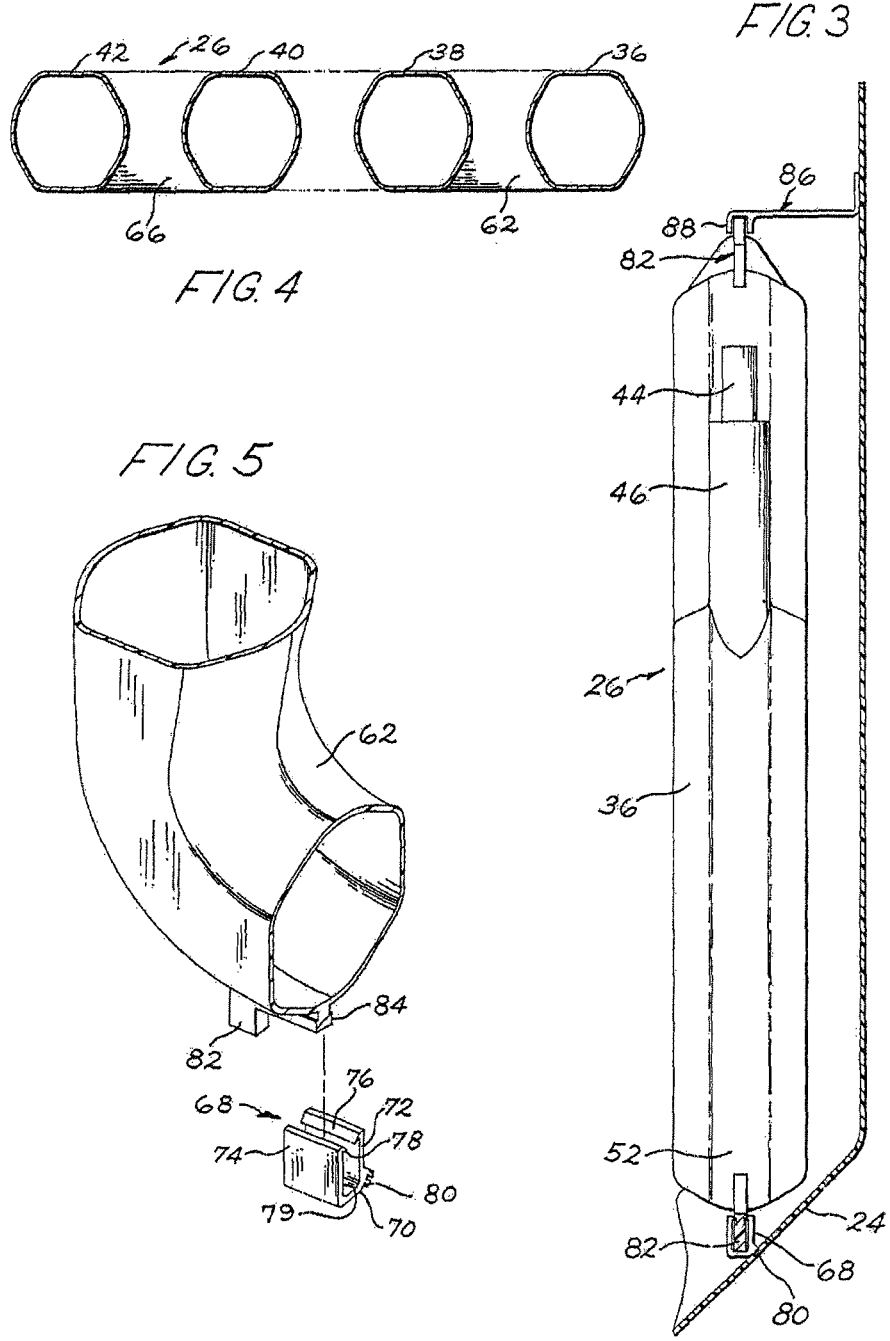

Prior Art

METHOD FOR MAKING A RESERVOIR

This application is a continuation in part of U.S. patent application Ser. No. 12/967,567, filed Dec. 14, 2010, now U.S. Pat. No. 8,431,067, which is a continuation in part of U.S. patent application Ser. No. 11/682,477, filed Mar. 6, 2007, now U.S. Pat. No. 7,850,898, the disclosures of which are incorporated herein by reference.

TECHNICAL FIELD

This invention relates to a reservoir volume which includes a main body reservoir utilizing an extruded profile into which are added ingress and egress lines utilizing fittings that are sealingly engaged into the reservoir volume.

BACKGROUND OF THE INVENTION

It is known to provide dispenser units in the front doors of refrigerators in order to enhance the accessibility to ice and/or water. Typically, such a dispenser unit will be formed in the freezer door of a side-by-side style refrigerator or in the fresh food or freezer door of a top mount style refrigerator. In either case, a water line will be connected to the refrigerator in order to supply the needed water for the operation of the dispenser. For use in dispensing the water, it is common to provide a water tank within the fresh food compartment to act as a reservoir such that a certain quantity of the water can be chilled prior to being dispensed.

Prior dispenser equipped refrigerators incorporated blow molded water tanks which are arranged vertically in lower sections of the fresh food compartments. More specifically, such a water tank is typically positioned behind a crisper bin or a meat keeper pan within a bottom section of the fresh food compartment so as to be subjected to the cooling air circulating within the compartment. Of course, locating the water tank in the bottom section of the fresh food compartment reduces the permissible size of the crisper bin and/or meat keeper. In addition, since the tank is not an aesthetically appealing feature of the refrigerator, it is generally hidden from view by a sight enhancing cover.

There are at least two commonly employed methods for attaching ingress and egress tubes to the water reservoir. One approach involves the injection molding of threaded flights of screws for use with a correspondingly threaded nut and ferrule or o-ring combination. This approach is illustrated in U.S. Pat. Nos. 3,511,415 (to Crowe); or 3,982,406 (to Hanson et al.). Another approach involves friction fitting of an elastic plastic tube over an injection molded inlet and/or outlet, with optional molded ribs. This approach is illustrated in U.S. Pat. Nos. 4,739,629 (to True); 5,315,845 (to Lee); or 6,079,221 (to Senner). In order to minimize leaks with this type of connection, adjustable hose clamps are often used in conjunction with the friction fit of the elastic plastic hose.

Based on the above, there exists a need in the art for an improved method of manufacturing the water reservoir which minimizes the potential for leakage and which additionally minimizes the amount of manual intervention required to fasten the ingress (inlet) and egress (outlet) profiles of the water reservoir.

SUMMARY OF THE INVENTION

Disclosed is a process for making a reservoir including steps of positioning a hollow extrudate at a first temperature having a polymeric extrudate profile into a split mold having a cavity, the extrudate having a first end opening at a first end and second end opening at a second end, inserting a first fitting into the first end opening and optionally a second fitting into the second end opening, each fitting being at a respective fitting temperature less than the first temperature, the first fitting and the second fitting each having a respective body portion with an outer surface having a body circumference about an axis and a passageway there through, sealing the outer surface of the first fitting body with an interior surface of the extrudate first end opening using latent heat within the extrudate, the first fitting passageway in fluid communication with the hollow interior of the extrudate, and if present, sealing the outer surface of the second fitting body with an interior surface of the extrudate second end opening using latent heat within the extrudate, the second fitting passageway in fluid communication with the hollow interior of the extrudate, forming at least a portion of the extrudate against the mold cavity by applying a means for forming to the extrudate and forming a reservoir, releasing the means for forming, and removing the reservoir from the mold, the first fitting, and the second fitting, if present, sealed into the reservoir.

The first fitting and/or the second fitting may be polymeric molded fittings. In one alternative, the first fitting and/or the second fitting may be overmolded onto a profile, for example, a tube.

The present method may include a step of crosslinking said extrudate.

BRIEF DESCRIPTION OF THE DRAWINGS

The invention may take physical form in certain parts and arrangements of parts, a preferred embodiment of which will be described in detail in the specification and illustrated in the accompanying drawings, which form a part hereof, and wherein:

FIG. 3 is an enlarged view taken along lines 3-3 of Prior Art FIG. 2;

FIG. 4 is a cross-sectional view taken along lines 4-4 of Prior Art FIG. 2;

FIG. 5 is an enlarged perspective view of a portion of the Prior Art water storage tank;

DETAILED DESCRIPTION OF THE DRAWINGS

The invention is described with reference to the accompanying figures, which illustrate the best mode known to the inventor at the time of the filing of the application illustrating the method of forming the reservoir, preferably for transporting liquids although not limited to such, with connecting ingress and egress profiles of the invention.

Figure 1:
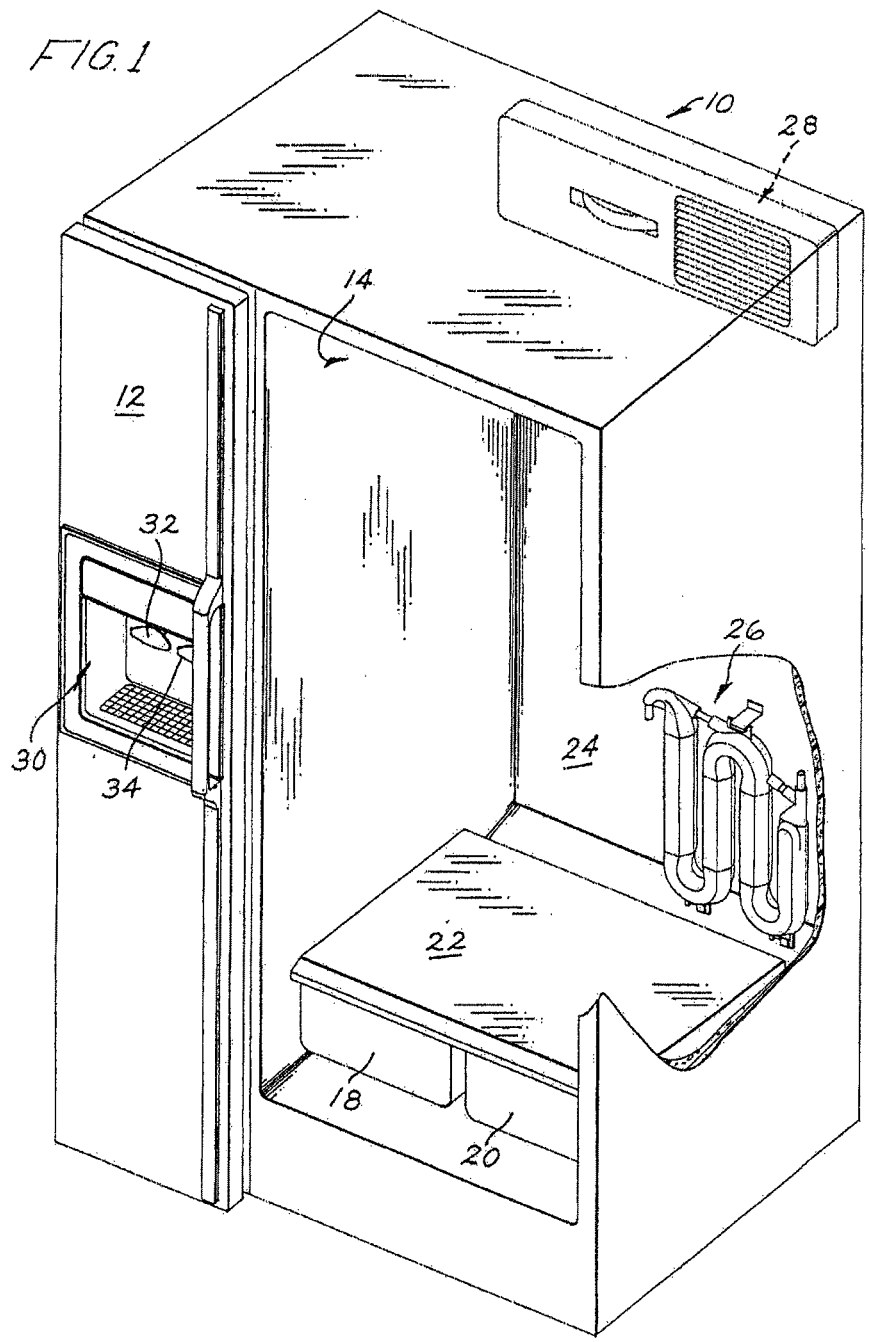
FIG. 1 is a perspective view of a side-by-side refrigerator with parts broken away showing a Prior Art reservoir volume with injection molded connections for ingress and egress tubes.
Figure 2:
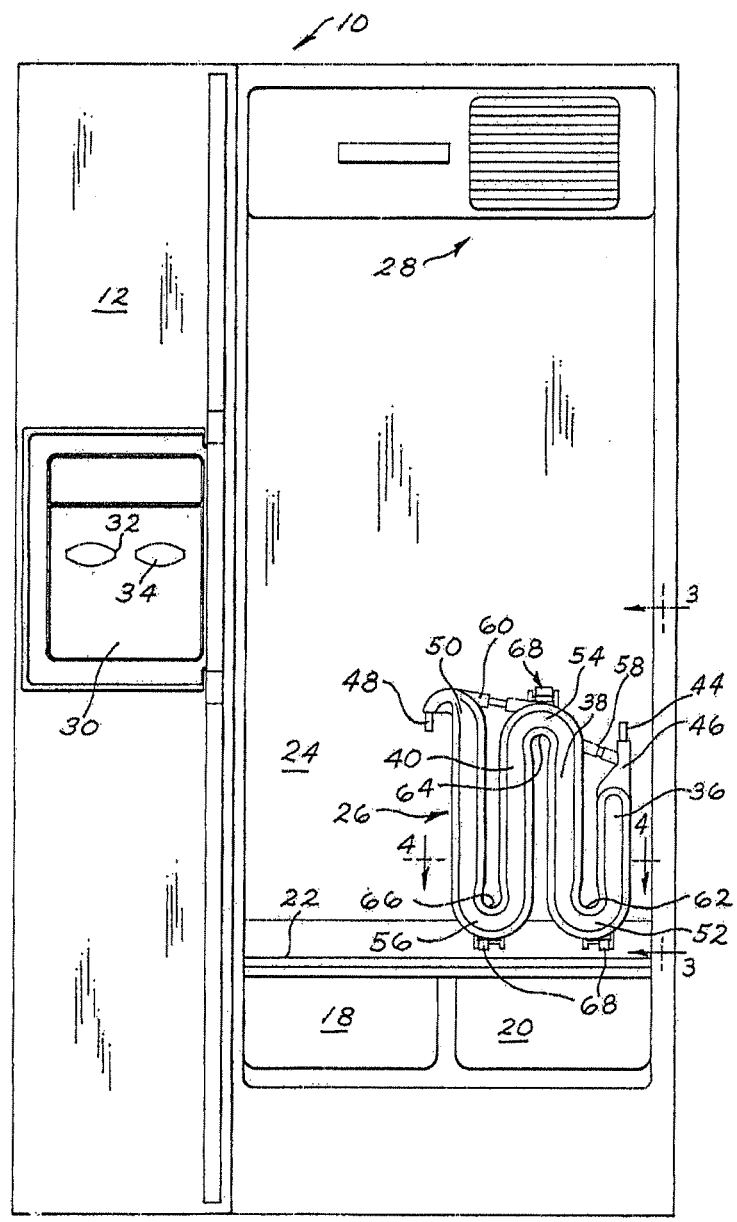
FIG. 2 is a side elevational view of a side-by-side refrigerator with the fresh food compartment door removed to show the Prior Art invention.

With reference to Prior Art FIG. 1 and FIG. 2, there is shown a refrigerator 10 of the side-by-side type wherein there is a freezer compartment on the left hand side closed by a freezer door 12 and a fresh food compartment 14 shown in the figures with the fresh food access door and shelves removed. At the bottom of the fresh food compartment 14 is a meat/vegetable pan assembly including two side-by-side pans 18 and 20, which are covered by a cover 22. Usually there is another vegetable pan above the assembly 16 that extends the width of the fresh food compartment that would be located in front of the water storage tank 26 of the present invention, which is secured to the rear wall 24 of the compartment. That pan has been omitted in order to see the water storage tank 26. Located at the top of the fresh food compartment is a cold air control assembly 28, which the user adjusts to regulate the amount of cold air being introduced from the freezer compartment into the fresh food compartment to keep it at the desired temperature.

The household refrigerator shown in the preferred embodiment is of the side-by-side type and has in the outside of the freezer door 12 a dispensing compartment 30 wherein the user may obtain ice cubes or cold water depending upon the selection by pressing one or the other of the actuators 32 or 34. Not shown is a tube connecting the water storage tank 26 to the outlet for dispensing the cold water into a glass held by the user in the dispensing compartment 30.

With particular reference to FIG. 1 and FIG. 2, the water storage tank 26 comprises a serpentine shaped hollow body having a first straight section 36, a second straight section 38, a third straight section 40, and a fourth straight section 42. These sections are essentially parallel to each other as shown in FIG. 2 and the first section 36 has an inlet 44 at the top end 46 and the fourth section 42 has an outlet 48 at the top end 50. The first section 36 is connected to the second section by a U-shaped curved section 52 at the bottom end, the second section 38 and third section 40 are connected at the top by a U-shaped curved section 54, and the third section 40 and fourth section 42 are connected at the bottom by a U-shaped curved section 56. In this Prior Art reservoir configuration, the four straight sections 36, 38, 40 and 42 are connected at the top thereof by air flow passageways and as shown in the figures. The first passageway extends from the top 46 of the straight section 36 to the top U-shaped curved section 54 and is designated as passageway 58. Between the top U-shaped curved portion 54 and the top end 50 of straight section 42 there is air passageway 60. In this particular Prior Art reservoir, these passageways are provided in order to bleed off any air trapped in the water storage tank so that the water in the tank may be dispensed in a desirable fashion. It will be noted that the four straight sections 36, 38, 40 and 42 are only connected by the three U-shaped curved sections 52, 54 and 56 and the air flow passageways 58 and 60.

Figure 6:
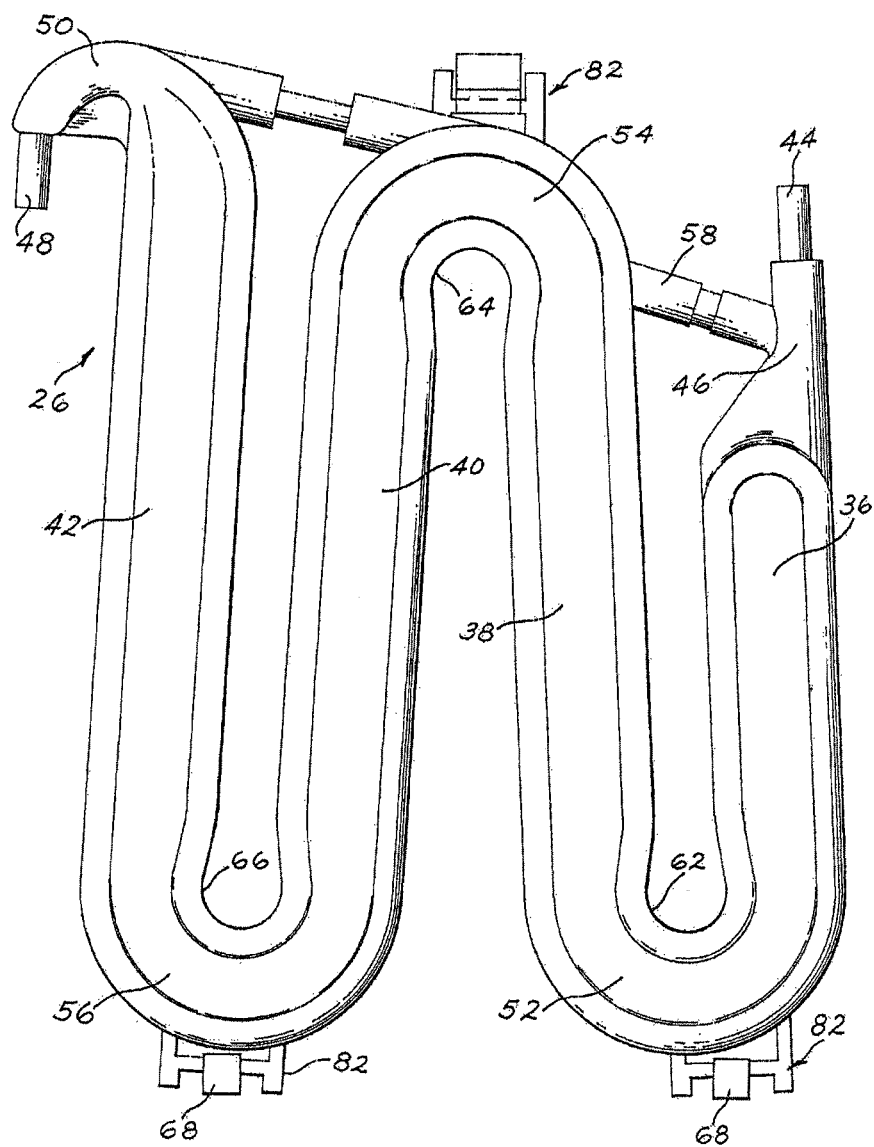
FIG. 6 is a side elevational view of the Prior Art water storage tank showing the configuration of the tank in the event water contained therein is frozen.

The water storage tank 26 is typically molded from polyethylene plastic material and in molding the storage tank the U-shaped curved sections 52, 54 and 56 have the internal curvature area 62, 64 and 66 respectively in the shape of a teardrop, which can readily been seen having a wider radius in each of the internal curvature areas 62, 64 and 66 relative to a straight sided reverse curvature. It has been found that with this teardrop shape increased surface area is provided in the curved sections so that in the event water in the tank freezes the material forming the internal curvature areas 62, 64 and 66 will stretch sufficient to prevent rupture of the walls of the water storage tank 26. Moreover, as shown in FIG. 6 the second straight section 38 and the third straight section 40 may separate or diverge from each other in a direction away from the top U-shaped curved section 54 and thus again relieve the force exerted on the water tank by the frozen water contained therein.

As shown particularly in Prior Art FIG. 4 and FIG. 5, the lateral cross-sections of the straight sections 36, 38, 40 and 42 may be polygon in shape. When the profile is hexagonal in cross-section, there is provided a plurality of relatively straight sides so that when the water in the tank 26 freezes the relatively straight sides will bow outwardly and approach a circle configuration as viewed in lateral cross-section, again relieving the internal stress caused by the frozen water to prevent rupture of the water storage tank. The water storage tank 26 in generally secured to the rear wall 24 of the fresh food compartment 14 and for this purpose there is provided storage tank support means 68, which may be in the form of a U-shaped channel having a base 70 and two spaced apart legs 72 and 74, which legs terminate with an inwardly directed flange 76 and 78 respectively. The legs and base form an open ended channel 79 and at the junction of the base 70 and the legs 72 is a projection 80, which as seen in FIG. 3 is inserted in an opening in the back wall 24 to support the storage tank support means 68. The water storage tank 26 has at least one securing member 82 located at the bottom of at least one U-shaped curved section such as section 52, which securing member 82 cooperates with the support means 68 to allow relative movement therebetween and to secure the water storage tank to the fresh food compartment. As illustrated in the Prior Art reservoir, the securing member 82 is molded in the water storage tank and has a T-shaped cross-section member 84, which slides into the channel 79 of the storage tank support means 68. As can be seen, the T-shaped member 84 can move back and forth in the storage tank support means 68 thereby providing relative movement between the T-shaped member 84 and the support means 68.

In the Prior Art water reservoir illustrated, there are two of these assemblies at the bottom of the water storage tank 26, one located at the bottom of the U-shaped curved section 52 and another at the bottom of the U-shaped curved section 56. The top of the water storage tank 26 is also secured to the rear wall 24 of the fresh food compartment by means of a clip 86 having one end fastened by suitable means to the rear wall 24 and the opposite end having a U-shaped portion 88, which receives therein the upper securing member 82 so that the securing member 82 cooperates with the U-shaped section 88 to prevent movement of the water storage tank relative to the rear wall 24. The securing member 82 at the top of the water tank is also molded along with the water tank and is formed in the U-shaped curved section 54. It will be noted that the Prior Art water storage tank 26 may have two sections, one made up of straight sections 36 and 38 and one made up of straight sections 40 and 42. With this structural arrangement the two sections may be physically moved away from each other at the bottom thereof. This spread apart position is shown in FIG. 6. In the event water in the water storage tank 26 freezes, these two sections can spread apart at the bottom to help relieve the internal stresses caused by the frozen water and also help to prevent rupture of the storage tank. This movement of the two sections is permitted because of the relative movement allowed by the cooperative arrangement between the securing member 82 and the storage tank support means 68 at the bottom of the storage tank.

Figure 7:
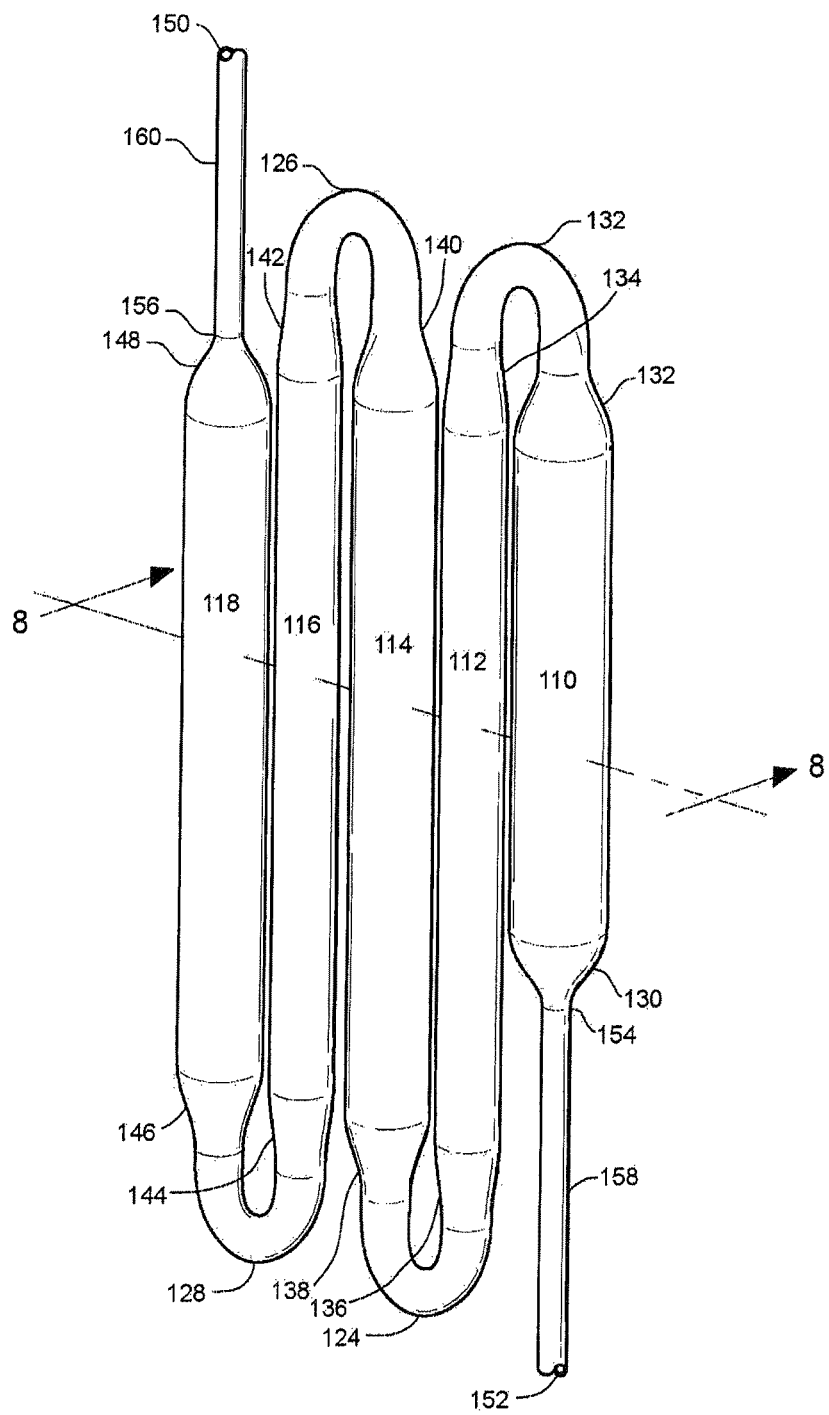
FIG. 7 is a front perspective view of a water reservoir of the invention with ingress and egress tubes molded thereto.
Figure 8:
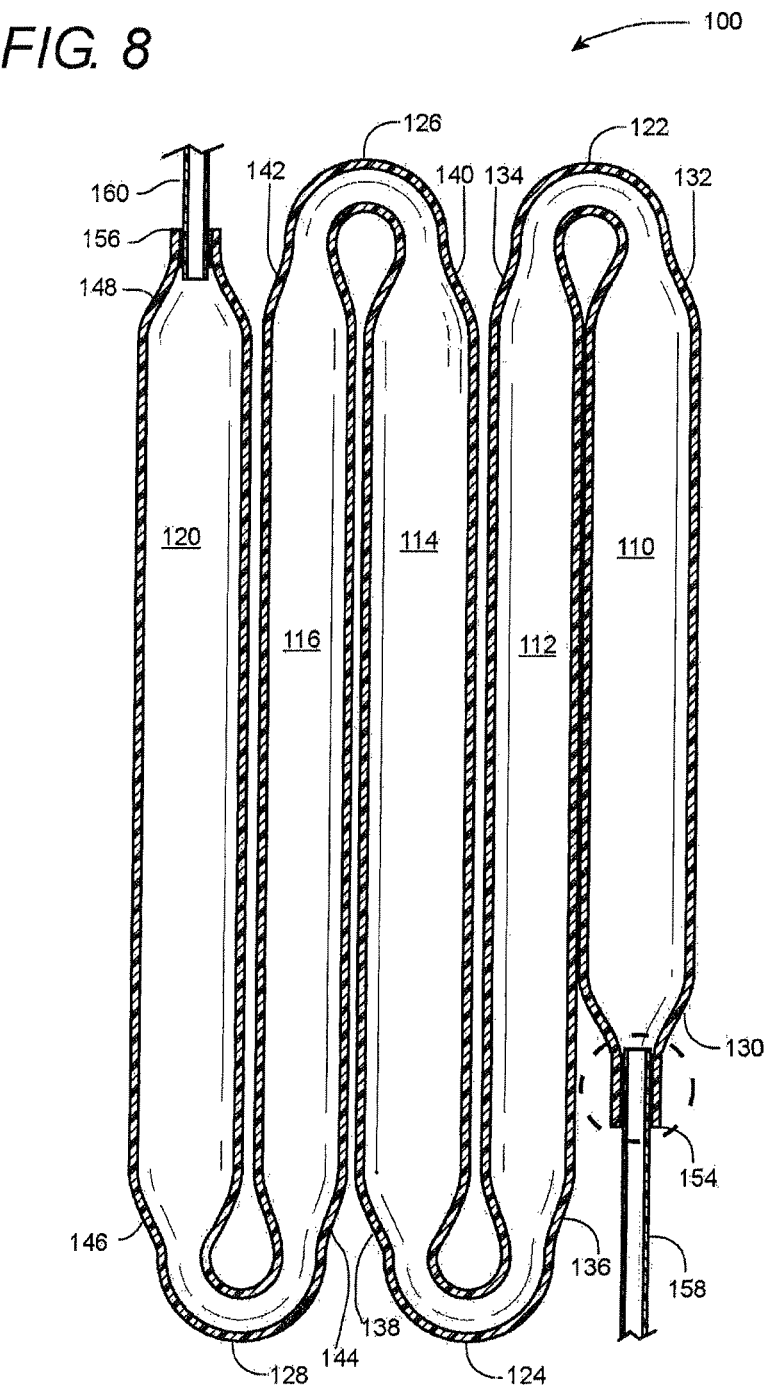
FIG. 8 is a cross-sectional view taken along lines 8-8 of FIG. 7.

FIG. 7 and FIG. 8 illustrate one embodiment of the reservoir 100, preferably a water reservoir of this invention, preferably for use in refrigerator chilled water dispensers as well as ice cube makers. Water reservoir 100 includes a serpentine main body containing a plurality of essentially parallel profile volumes, 110, 112, 114, 116, 118, which are preferably cylindrical in shape, although any polygon shape in cross-section is applicable as evidenced by the polygon-shape of the Prior Art in FIGS. 4-5. While five (5) interconnected volumes are shown in the figure, there is no need to limit the scope of the invention to any particular number, and the number of regions or sections is simply a measure of the capacity of the reservoir. In general, a greater number of interconnected cylindrical volumes is preferred over one large cylindrical volume in that the water cooling rate is slower for larger volumes due to the decreased aqueous surface area, which is in direct contact with the chilled walls of the volume, thereby requiring increased time to cool the water to the desired temperature.

The volumes have an expanded middle section and a pair of oppositely necked regions 132, 134, 136, 138, 140, 142, 144 and 146 at each end of the middle section. Each necked region is interconnected to each other by generally U-shaped bends 122, 124, 126 and 128. The first 110 and last 118 volume also have initial 130 and terminal 148 necked regions, which initiate and terminate at sealing regions 154 and 156 respectively with inserted ingress 158 and egress 160 profiles, preferably cylindrical tubes.

Figure 8A:
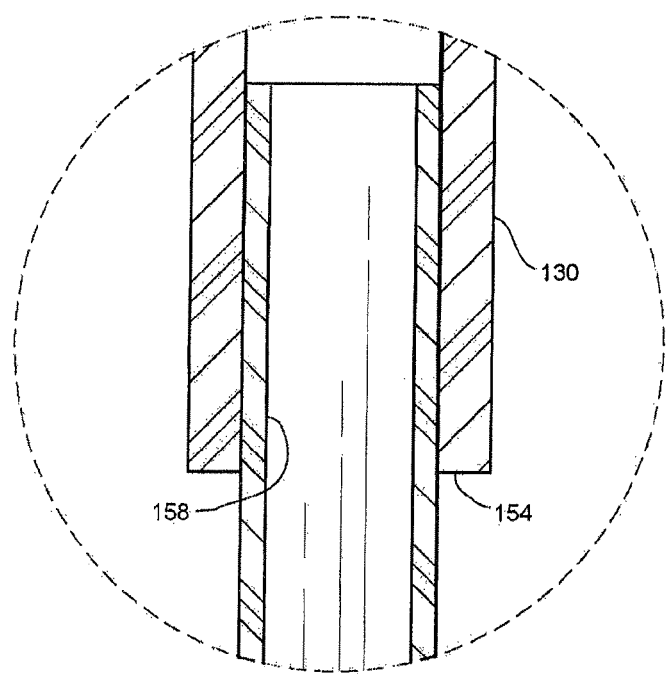
FIG. 8a is an exploded view of one of the molded tube areas of FIG. 8 without insert.
Figure 8B:
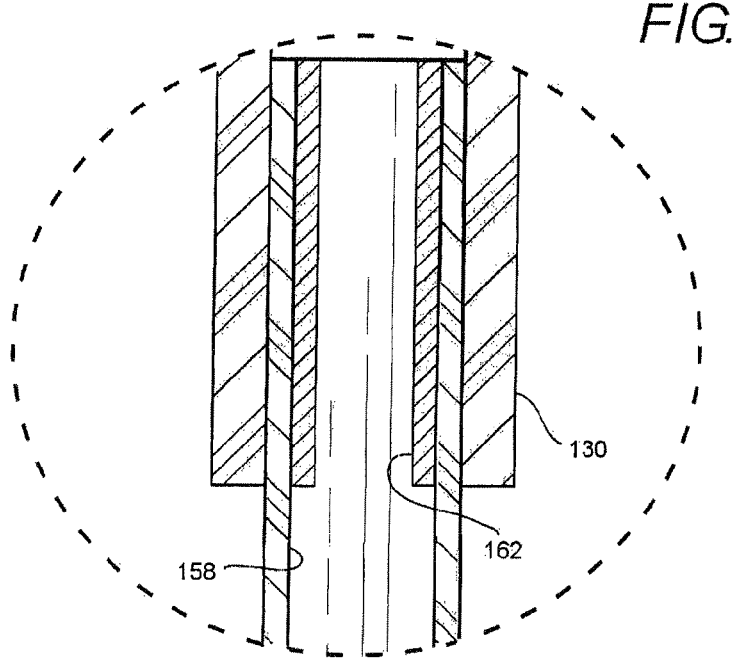
FIG. 8b is an exploded view of one of the molded tube areas of FIG. 8 with insert.

Water reservoir 100 is made by initially extruding an initial profile, preferably essentially cylindrical as illustrated in FIGS. 7-8b. As the profile is extruded, it can either be cut to a predetermined length, and transitioned into a heating oven, or transferred immediately into a mold. As one example, in order to manufacture the serpentine profile illustrated in the figures, the mold will need to have a corresponding serpentine configuration. The mold internal dimensions are of similar diameter to that of the extrudate profile for the U-shaped bend regions, and preferably are slightly larger. The diameter of the middle section of the mold will be larger than that of the extrudate. In any event, the shape of the mold is as desired to manufacture a corresponding reservoir configuration. In the process embodiment where the extrudate is transitioned immediately into the mold, an operator manually shapes the extrudate to follow the path of the mold. After positioning of the extrudate, the operator inserts at least a portion of inlet profile 158 and outlet profile 160 into the beginning and end apertures of the extrudate profile. The depth of the insertion defines the sealing region of the exterior surface of the inserted profile with the interior surface of the extrudate. The operator seals one profile end and connects the other profile end to a source of pressure, typically compressed air. The mold is closed and pressure applied to expand the profile within the mold to conform to the mold cavity dimensions.

While the option of sealing one end of the profile is described above, it is envisioned that an operator may choose to connect both profile ends to a source of pressure and expansion of the extrudate is effected from both ends. It is further envisioned that vacuum could be applied to the exterior of the extrudate in the mold to assist in the expansion process of the extrudate or used as the sole means of effecting the extrudate expansion within the mold.

In another embodiment of the invention, namely the process whereby the initial extrudate is transitioned into a heating oven, the extrudate profile is heated or maintained at a temperature at which the profile is malleable, yet will not collapse upon itself. This extrudate profile is transferred into a mold having a cavity of the desired geometry and the process is repeated in a manner similar to that described above.

As illustrated in FIG. 8a and FIG. 8b, depending upon the material composition of the extrudate, and the temperatures involved, it is an optional process variation to have an insert 162 positioned at each end of the inlet profile 158 and outlet profile 160. This insert may be metallic or polymeric and is used to insure that at least a portion of the heated portion of the inserted profile remains open for liquid to flow therein. The need for this insert is known to those skilled in the art depending upon the mold temperatures and/or the extrusion temperature and the interaction therebetween.

By inserting the inlet and outlet tubes into the heated extrudate profile, it is possible to obtain a material-to-material bond therebetween by a judicious choice of the composition of each. There are several means by which this bond may be effected. One of the simplest procedures is to insure that at least a component of the inlet and outlet profiles and that of the reservoir main body polymer profile is the same. Alternatively, it would be possible to insure that at least a portion of the polymer composition of the inlet and outlet profiles and that of the reservoir main body polymer profile is sufficiently similar or compatible so as to permit the melt fusion or blending or alloying to occur at least in the interfacial region between the exterior surfaces of the inserted profiles and the contacting interior region of the extrudate main body polymer profile. Another manner in which to state this would be to indicate that at least a portion of the polymer compositions of the inserted profiles and main body are miscible.

While the precise composition of the inserted profiles and main body profile polymer are not required to be of any specified composition, in general, there are several guidelines that are applicable in the practice of this invention. It is of course, recognized that the precise operating conditions utilized in the sealing process are well-known in the art and are specific to each polymer combination. It is well within the skill of the art to determine the applicable conditions that will result in the appropriate degree of bonding required for the intended end-use application, which is dependent upon the required pressure that the final water reservoir will be subject to. Shorter cycle times will be achieved with higher mold temperatures and vice-versa. Similar considerations will be applicable dependent upon the thickness of the parts to be sealed together. The inserted plastic profiles can be a thermoplastic or a thermoset. The key is that the overlapping regions of the main extrudate profile with that of the inserted profile must be capable of forming a leak-proof bond, either chemical or physical.

The above conditions may be met by using polymer compositions that have differing softening points or may involve the use of two compositions that have the same softening point, but which are of different thickness. Through manipulation of the time, temperature and pressure conditions experienced during the compression molding operation, the inserted profile will not experience melt flow, even though it had a similar softening point or range. It is also possible that through the incorporation of various additives in the polymeric compositions, e.g., glass fibers, heat stabilizers, antioxidants, plasticizers, etc., the softening temperatures of the polymers may be controlled.

In one alternative, the composition of the main body of the water reservoir extrudate polymer will be such that it will be capable of at least some melt fusion with the composition of the inserted plastic profile, thereby maximizing the leak-proof characteristics of the interface between the exterior of the inserted profile and the interior of the main body extrudate. There are several means by which this may be effected. One of the simplest procedures is to insure that at least a component of the plastic conduit and that of the overmolded polymer is the same. Alternatively, it would be possible to insure that at least a portion of the polymer composition of the plastic conduit and that of the overmolded polymer is sufficiently similar or compatible so as to permit the melt fusion or blending or alloying to occur at least in the interfacial region between the exterior of the plastic conduit and the interior region of the overmolded polymer. Another manner in which to state this would be to indicate that at least a portion of the polymer compositions of the plastic conduit and the overmolded polymer are miscible.

Depending on the equipment available, the end application requirements, cost factors, etc., the starting extrudate material will be different. For many applications, polyolefins, e.g., polypropylene, polyethylene, etc., are preferred. Depending on the application, the polyethylene may be crosslinked, or partially crosslinked. The crosslinking of the polyethylene may be effected in two stages, with an initial degree of crosslinking being less than 50%, preferably less than 35%, followed by post-extrusion processing, and ultimately a second degree of crosslinking raising the final degree of crosslinking to at least 60% or higher, often to 85%. Cost usually decides which crosslinking method needs to be used to provide a given quality of tubing. The benefit of crosslinking the polyethylene subsequent to the fabrication steps described in the application is that a chemical and/or thermal material bond is formed during the compression molding processes, resulting in a stronger product. However, there may be applications where this high degree of bonding is not essential, thereby permitting the use of previously crosslinked material during the fabrication procedure. Previously crosslinked material has a much better hot melt strength since the crosslinking gives it more structure, and making forming easier. However, the crosslinked material will not chemically bond to itself even when heated to the clear state. The material in the formed ends is not completely sealed upon itself, but molded in place with pressure.

Crosslinking can of course, be accomplished in many different ways. Crosslinking can be performed during the extrusion process, e.g., by Engel process, or post-extrusion, e.g., by a silane process or a peroxide process or combinations thereof wherein some crosslinking occurs during the extrusion step and is completed in a hot bath post-extrusion step. Each process has a crosslinking catalyst that causes the polymer to crosslink when certain temperature and pressure are used. One additional way to crosslink is to use radiation. In this method, extruded tubes are passed under a radiation unit, such as an electron beam, or alternatively gamma irradiation, and the exposure causes crosslinking. It usually is more economical to radiate straight tubes since the economics revolve around how many parts will fit on a cart that rolls under the beam. However, this does not represent the only embodiment contemplated within the invention. It is envisioned that under some circumstances, it would be appropriate to crosslink the final product. Crosslinking of plastics, particularly polyolefins, most preferably polyethylene is desirable in that it removes any odor and/or taste-imparting additives that may be leached from the plastic when in contact with water.

In addition, crosslinking imparts shape memory properties to polymers. Crosslinking imparts a "memory" to the material's dimensions, and upon deformation of the same, will tend to resort back to the original dimension when crosslinked upon the application of a transforming force in a manner described later in the application. In one application, this shape-memory feature may be used to provide leak-proof engagement of sealing regions 154 and 156 respectively with inserted ingress 158 and egress 160 profiles.

Shape memory materials have the ability to return from a deformed state (temporary shape) to their original (permanent shape) induced by an external stimulus (trigger), such as a temperature change. In addition to temperature, shape memory effects can be triggered by an electric field, magnetic field, light or a change in pH or even the passage of time. Shape memory polymers include thermoplastic and thermoset (covalently crosslinked) polymeric materials.

Shape memory materials are stimuli-responsive materials. They have the capability of changing their shape upon application of an external stimulus. A change in shape caused by a change in temperature is typically called a thermally induced shape memory effect. The procedure for using shape memory typically involves conventionally processing a polymer to receive its permanent shape. Afterward, the polymer is deformed and the intended temporary shape is fixed. This process is often called programming. The programming process may consist of heating the sample, deforming, and cooling the sample, or drawing the sample at a low temperature. The permanent shape is now stored while the sample shows the temporary shape. To revert the temporary shape back to the permanent shape, an external stimulus may be applied, such as heating the shape memory polymer above a transition temperature $T_{trans}$ induces the shape memory effect. In addition to the application of an external stimulus, it is possible to apply an "internal" stimulus (e.g., the passage of time) and achieve a similar, if not identical result.

A crosslinked network may be formed by low doses of irradiation. Materials that are most often used for the production of shape memory linear polymers by ionizing radiation include high density polyethylene, low density polyethylene and copolymers of polyethylene and poly(vinyl acetate). After shaping, for example, by extrusion or molding, the polymer is covalently crosslinked by means of ionizing radiation, for example, by highly accelerated electrons. The energy and dose of the radiation are adjusted to the geometry of the sample to reach a sufficiently high degree of crosslinking, and hence sufficient fixation of the permanent shape.

Another example of chemical crosslinking includes heating poly(vinyl chloride) under a vacuum resulting in the elimination of hydrogen chloride in a thermal dehydrochlorination reaction. The material can be subsequently crosslinked in an HCl atmosphere. The polymer network obtained shows a shape memory effect. Yet another example is crosslinked poly[ethylene-co-(vinyl acetate)] produced by treating the radical initiator dicumyl peroxide with linear poly[ethylene-co-(vinyl acetate)] in a thermally induced crosslinking process. Materials with different degrees of crosslinking are obtained depending on the initiator concentration, the crosslinking temperature and the curing time. Covalently crosslinked copolymers made from stearyl acrylate, methacrylate, and N,N'-methylenebisacrylamide as a crosslinker.

In addition, shape memory polymers include polyurethanes, polyurethanes with ionic or mesogenic components, block copolymers consisting of polyethyleneterephthalate and polyethyleneoxide, block copolymers containing polystyrene and poly(1,4-butadiene), and an ABA triblock copolymer made from poly(2-methyl-2-oxazoline) and poly(tetrahydrofuran). Further examples include block copolymers made of polyethylene terephthalate and polyethylene oxide, block copolymers made of polystyrene and poly(1,4-butadiene) as well as ABA triblock copolymers made from poly(tetrahydrofuran) and poly(2-methyl-2-oxazoline). Other thermoplastic polymers that exhibit shape memory characteristics include polynorbornene, and polyethylene grated with nylon-6 that has been produced for example, in a reactive blending process of polyethylene with nylon-6 by adding maleic anhydride and dicumyl peroxide.

Figure 9A:
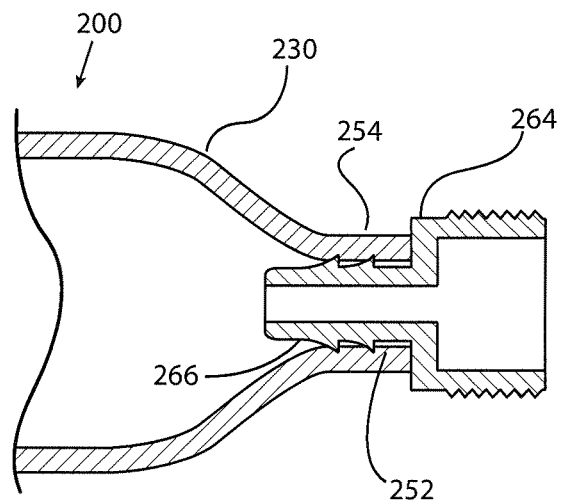
FIG. 9a is an exploded cross-sectional view through an end of an alternative reservoir of the present disclosure.
Figure 9B:
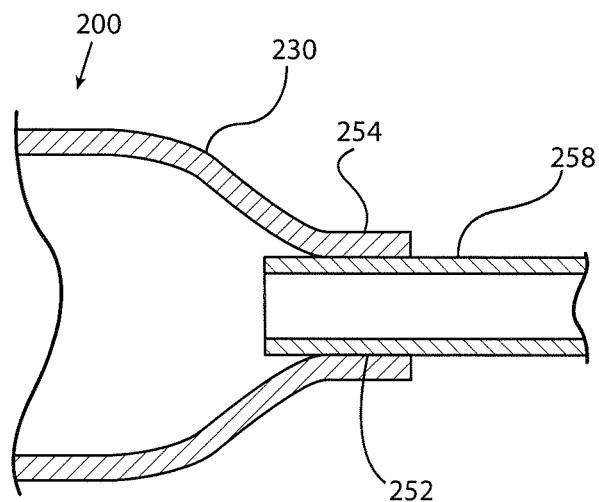
FIG. 9b is an exploded cross-sectional view through an end of yet another alternative reservoir of the present disclosure.

The shape memory property may be used to compressively seal a connection in the end of the water reservoir. In one alternative, the process for making a reservoir 200, alternative end details of which are shown in FIGS. 9A and 9B, may include forming the water reservoir 200 by initially extruding an initial profile of a shape memory polymer and transferring the profile to a mold having a cavity having at least one cavity dimension that is larger than a corresponding dimension of said extrudate profile as discussed above. The extrudate profile, having a first opening at a first end and a second opening at a second end may be placed in the mold by an operator manually shaping the extrudate to follow the path of the mold. The mold provides a source of pressure, typically compressed air, through a blow pin in the first opening, the second opening, or a combination thereof. The mold is closed sealing the extrudate around the blow pin and pressure applied to expand the profile within the mold to conform to the mold cavity dimensions, and forming at least one of the first and the second opening to a desired internal opening diameter. As shown in FIG. 9A, the reservoir 200 includes a initial necked region 230 that transitions to a sealing region 254. The mold forms the first opening to a desired first internal opening diameter 252. The desired first internal opening diameter 252 may be smaller than the extrudate profile diameter such as shown in FIGS. 9A and 9B. Alternatively, the desired first internal opening diameter 252 may be larger than the extrudate profile diameter (not shown).

After the molded profile is removed from the mold forming a reservoir, the reservoir is crosslinked as discussed above. The crosslinking sets the desired internal opening diameter of the first 252 and/or second opening. Then, a connection profile may be compressively sealed in the internal opening diameter using the shape memory properties of the crosslinked material such as shown in FIG. 9A and 9B. As shown in FIG. 9A, the connection profile may be a fitting 264. The fitting 264 may be a hose or tube connection, an insert, a valve, a connection overmolded onto an extruded profile, or other connection as desired. The connection profile may include a hose barb 266. Alternatively, the connection profile may be an extruded or molded hollow polymeric profile 258, such as a tube as shown in FIG. 9B. The connection profile may be made of thermoplastic material, thermoset, brass, stainless steel, or other metal as desired.

In one alternative, the process for making a reservoir may include, after crosslinking the reservoir 200, inserting the connection profile into the reservoir end by forcibly enlarging the first and/or second opening diameter at a low temperature, such as room temperature, or may be slightly heated, such as up to about 100° F. to reduce the force required. The expansion of the diameter may be done by pressing a mandrel or other tool into the opening. Alternatively, enlarging the first and/or second opening may be accomplished by directly inserting the end of the connection profile into the opening. Alternately, the programming process may include steps of heating the sample, deforming on a mandrel or other tool, and cooling the sample as discussed above.

To provide a compressive seal, the shape of the end of the connection profile may correspond to the shape of the first or second opening in which it is to be installed. For example, the connection profile may include a cylindrical exterior surface having a diameter larger than the diameter of the desired internal diameter of the opening, but smaller than the enlarged opening diameter. Alternatively, the exterior surface of the end of the connection profile may include a hose barb or other retaining features. In yet another alternative, a feature may be formed in the interior surface of the first or second opening, such as a protrusion or undercut, to engage a corresponding feature on the connection profile.

After the connection profile is inserted into the desired first or second opening, an external stimulus (e.g. heat) or internal stimulus (e.g. time) or combination thereof may be applied to the opening to induce the shape memory property of the material to contract the opening compressively sealing the exterior surface of the first connection profile with the interior surface of the end opening of the extrudate, thereby forming the reservoir with desired end configuration, wherein said reservoir includes the connection profiles.

It is contemplated that a reservoir may include a first connection profile comprising a fitting on a first end and a second connection profile comprising a polymeric tube on a second end. Alternatively, the reservoir may include connection profiles comprising a first fitting on the first end and a second fitting on the second end. In another alternative, the reservoir may include a polymeric profile compressively sealed in the mold in the first end using the latent heat within the extrudate as discussed above, and a connection profile inserted into the second end after crosslinking the reservoir.

Figure 10:
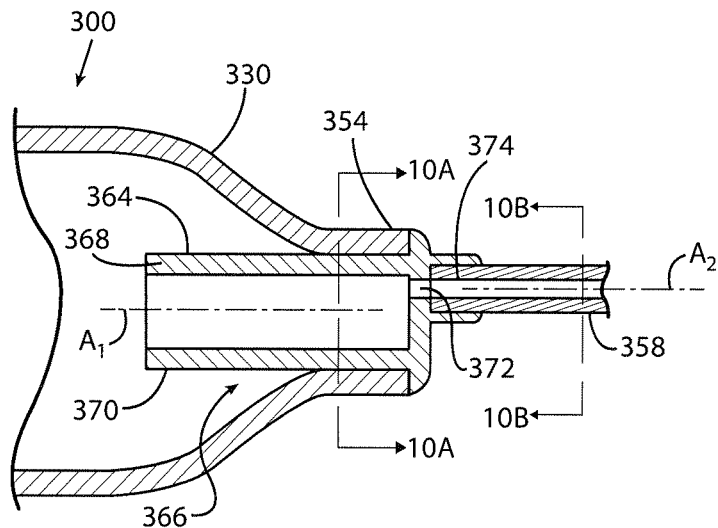
FIG. 10 is a partial cross sectional view of a reservoir having a fitting sealing engaging a tank portion of the reservoir.
Figure 10A:
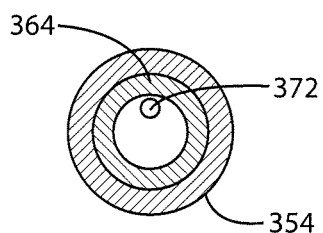
FIG. 10A is a cross sectional view taken through the section 10A-10A in FIG. 10 showing a passageway there through offset from a fitting axis.
Figure 10B:
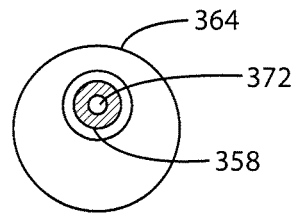
FIG. 10B is a cross sectional view taken through the section 10B-10B in FIG. 10.

In another embodiment of the present invention, shown by example in FIG. 10, a reservoir 300 formed from an extrudate may include a fitting 364 in a first end opening 366 of the extrudate connected to the extrudate in a sealing region 354 of the reservoir. The fitting 364 may include a profile 358 connected to the fitting 364. In certain applications, the profile 358 may be a tube. The fitting 364 includes a body portion 368 with an outer surface 370 having a body circumference about an axis $A_1$ and a passageway 372 there through, the passageway 372 in fluid communication with the hollow interior of the reservoir. As shown in FIG. 10, the reservoir 300 may include a necked region 330 transitioning to the sealing region 354 connecting to the outer surface 370 of the body portion 368. For certain applications such as water reservoirs, the bond between the fitting and the extrudate is a leak-proof bond.

Figure 11:
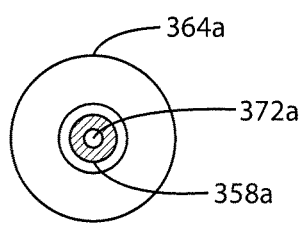
FIG. 11 is a cross sectional view taken through an alternative fitting assembly showing a passageway there through approximately coaxial with a fitting axis.

As shown in FIG. 10, a longitudinal axis $A_2$ of the profile 358 may be offset from the fitting body portion axis $A_1$. Alternatively, as shown in FIG. 11, a longitudinal axis through the passageway 372a and the profile 358a connected thereto may be coaxial with the first fitting body portion axis $A_1$. For certain applications, such as shown by example in FIG. 12, the passageway 372b may be angled such that the longitudinal axis $A_3$ through the profile 358b connected to the fitting 364b is transverse to the fitting body portion axis $A_1$.

In the embodiment shown in FIG. 10, the fitting 364 may be overmolded onto the profile 358. The fitting 364 may be overmolded by at least partially inserting an end of the profile 358 into a split mold having a cavity corresponding to the shape of the fitting, and injection overmolding the fitting onto the end of the profile in the mold. During the overmolding process, a bond is formed in an interfacial region 374 between an exterior surface of the profile end and an interior surface of the overmolded fitting.

To achieve a material-to-material bond between the overmolded fitting and connected profile, the composition of the overmolded fitting will be such that it will be capable of at least some melt fusion with the composition of the plastic profile, thereby maximizing the leak-proof characteristics of the interface between the exterior of the profile and an interior surface of the fitting. To achieve a material-to-material bond in one embodiment, at least a component of the polymer composition of the plastic profile and that of the overmolded polymer is the same. Alternatively, at least a portion of the polymer composition of the plastic profile and that of the overmolded polymer is sufficiently similar or compatible so as to permit the melt fusion or blending or alloying to occur at least in the interfacial region between the exterior of the plastic profile and the interior region of the overmolded fitting. Another manner in which to state this would be to indicate that at least a portion of the polymer compositions of the plastic profile and the overmolded fitting are miscible.

Figure 12:
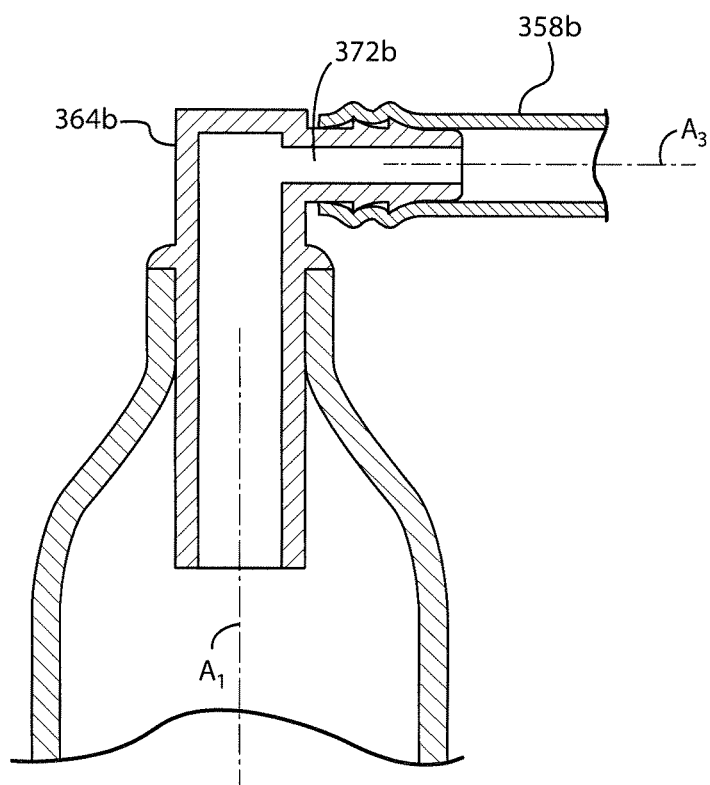
FIG. 12 is a partial cross sectional view taken through yet another alternative fitting assembly showing a passageway there through connected transverse to a fitting axis.

In other embodiments, a profile, such as a tube, is connected to the fitting using a mechanical connection, such as a hose barb, threaded fitting, or other mechanical connection, such as shown by example in FIG. 12.

The reservoir 300 is formed from an extrudate having two ends. In one embodiment, a fitting is provided in the first end of the extrudate and the second end of the extrudate may be pinched off while hot or otherwise sealed closed. In another embodiment, a fitting is provided in each end of the extrudate. In yet another alternative, a fitting provided in the first end of the extrudate and a profile is sealed in the second end as discussed above with reference to FIGS. 7 and 8.

As discussed above, the water reservoir 100 may be made using an extrudate having an initial profile. The extrudate initial profile may be cylindrical for forming an approximately cylindrical cross-section reservoir as illustrated in FIGS. 7, 8, and 12, or may be any other profile cross sectional shape as desired for the application. As discussed above, extruded profiles may be transferred to a heating oven and then transferred from the heating oven into a mold while retaining latent heat for forming the reservoir. Alternatively, the extruded profiles may be transferred immediately from the extruder into a mold while retaining latent heat of extrusion for forming the reservoir. In either event, the mold includes a mold cavity having a shape corresponding to the desired reservoir configuration. The extrudate temperature may be approximately at the extrusion temperature or slightly below.

In one application of the present process, an operator manually shapes the warm extrudate in the mold along the mold cavity. After positioning of the extrudate, the operator inserts a first fitting 364 into the first end opening 366 and optionally a second fitting into the second end opening, where each inserted fitting is typically at a respective fitting temperature that is less than the extrudate temperature. The depth of the insertion and the shape of the mold cavity defines the sealing region 354 between the exterior surface of the inserted fitting with the interior surface of the extrudate. The mold is closed and at least a portion of the extrudate formed against the mold cavity by applying a means for forming to the extrudate to form the reservoir. The latent heat in the extrudate improves the formability of the extrudate material in the mold cavity and improves bonding between the fitting and the extrudate.

The reservoir 300 includes the fitting 364 sealed in an end of the reservoir. The outer surface of the fitting body seals with an interior surface of the extrudate first end opening using latent heat within the extrudate. The mold may be shaped to compress the extrudate material around the fitting body. In one alternative, the composition of the extrudate polymer will be such that it will be capable of at least some melt fusion with the composition of the inserted fitting, thereby maximizing the leak-proof characteristics of the interface between the exterior of the inserted profile and the interior of the main body extrudate. As discussed above with respect to profiles, a material-to-material bond may be provided by selecting polymer materials such that at least a component of the polymer material in the fitting and that of the extrudate is the same. Alternatively, a material-to-material bond may be provided when at least a portion of the polymer composition of the fitting and that of the extrudate is sufficiently similar or compatible so as to permit the melt fusion or blending or alloying to occur at least in the interfacial region between the exterior of the fitting body portion and the interior region of the extrudate. Another manner in which to state this would be to indicate that at least a portion of the polymer compositions of the plastic fitting and the extrudate are miscible.

In one embodiment, the means for forming provides pressurizing the interior of the extrudate to form the extrudate against the mold cavity surfaces. In this embodiment, the means for forming include a source of pressurized gas connectable to the interior of the extrudate by way of a tube, hollow profile, pipe, or other conveyance. The source of pressurized gas may be connectable to the fitting inserted into the end of the extrudate, or may be connectable to a profile attached to the fitting inserted into the end of the extrudate. In certain applications without a fitting in the end of the extrudate, the source of pressurized gas may be connectable with the end of the extrudate. In any event, the connection to the interior of the extrudate is sealed sufficiently to retain pressure in the interior of the extrudate.

Using a source of pressurized gas, the process of forming the extrudate against the mold cavity surfaces may include the steps of providing a source of pressurized gas to the interior of the hollow extrudate through the second end opening of the extrudate, the first end opening of the extrudate, or a combination thereof, closing the mold and pressurizing the hollow extrudate by applying pressurized gas to the interior of the extrudate forming the extrudate against the mold cavity. The source of pressurized gas may be applied to the first end of the extrudate with the second end of the extrudate being sealed to retain pressure, such as for example by pinching off the end of the extrudate, or inserting a plug, or closing the end with a clamp, inserting a closed fitting, or any other techniques for closing the end of the extrudate. Alternatively, the source of pressurized gas may be applied to the second end of the extrudate with the first end of the extrudate being sealed to retain pressure. In yet another alternative, the source of pressurized gas may be applied to both the first end of the extrudate and the second end of the extrudate.

In one alternative, the means for forming provides a vacuum applied to exterior surfaces of the extrudate to form the extrudate against the mold cavity surfaces. In this embodiment, the means for forming include a source of vacuum connectable to the mold cavity surfaces by way of passageways, holes, apertures, or other openings connecting the vacuum source to the cavity surface. In various embodiments, a plurality of passageways may be provided through the mold cavity surface connected to the source of vacuum to provide the desired forming.

Using a source of vacuum, the process of forming the extrudate against the mold cavity surfaces may include the steps of providing a source of vacuum to an exterior surface of the extrudate through an interior surface of the mold cavity, closing the mold, and drawing the hollow extrudate by applying vacuum to the exterior surface of the extrudate forming the extrudate against the mold cavity.

In yet another alternative, the means for forming provides a vacuum applied to exterior surfaces of the extrudate, and pressurizing the interior of the extrudate to form the extrudate against the mold cavity surfaces. In this alternative, the means for forming include a source of pressurized gas connectable to the interior of the extrudate and a source of vacuum connectable to the mold cavity surfaces as discussed above.

Using a source of vacuum and a source of pressurizing gas, the process of forming the extrudate against the mold cavity surfaces may include the steps of providing a source of pressurized gas to the interior of the hollow extrudate through the second end opening of the extrudate, the first end opening of the extrudate, or a combination thereof, providing a source of vacuum to an exterior surface of the extrudate through an interior surface of the mold cavity, closing the mold, and selectively applying vacuum to the exterior surface of the extrudate and pressurizing the interior of the extrudate forming the extrudate against the mold cavity.

The process of making the reservoir 300 may include crosslinking the extrudate. In one application, the step of crosslinking is effected by exposing the reservoir to an electron beam, under which the extrudate and fittings are crosslinked. Alternatively or additionally, the hollow extrudate is at least partially crosslinked before the step of inserting a fitting. The extrudate may be a polyolefin material. Similarly, the fittings may be a polyolefin material. For certain applications, the extrudate and the fittings may be polyethylene.

Figure 13:
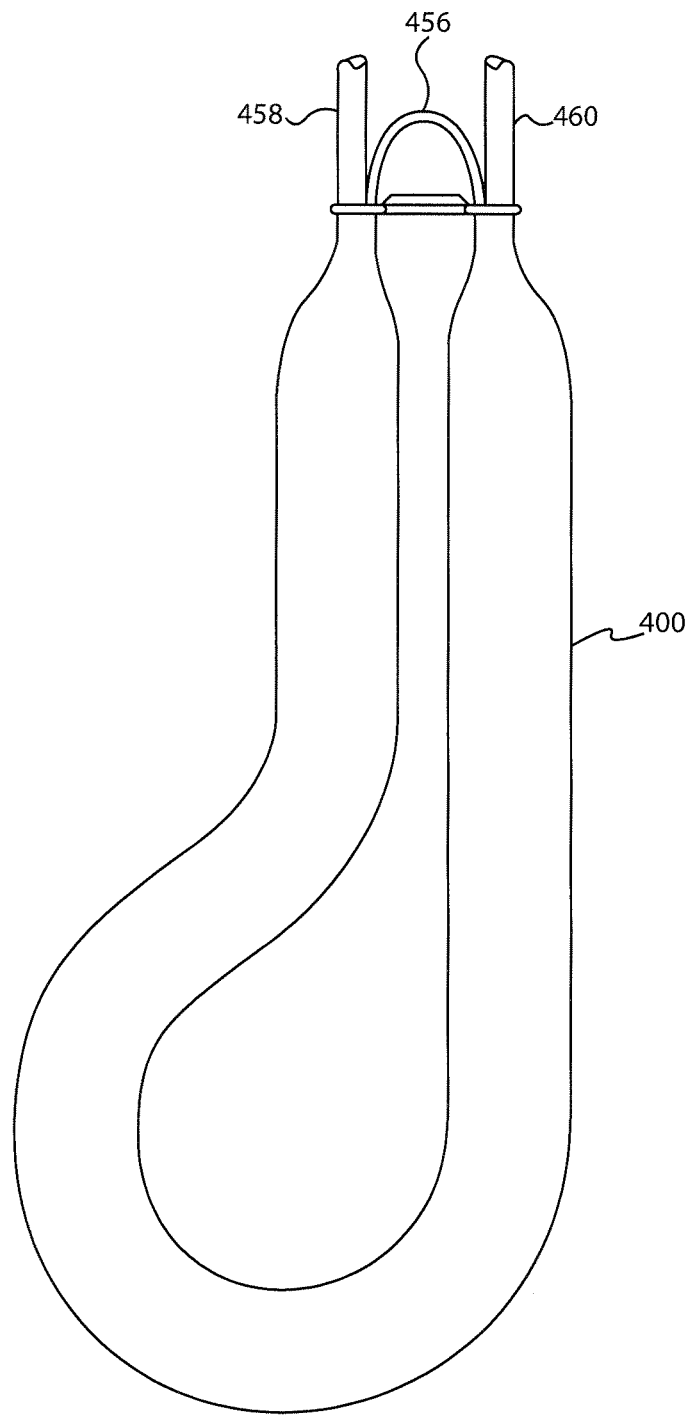
FIG. 13 is a side view of an alternative embodiment of a reservoir having a vent tube connecting the ends of the reservoir.

For certain applications, the first end of the extrudate and the second end of the extrudate may be adjacently positioned in forming a reservoir 400 such as shown by example in FIG. 13. The reservoir 400 may include an air flow passageway 456 between the first end and the second end. In the application shown in FIGS. 13 and 14, the reservoir 400 further includes a first fitting 464 connected to a first profile 458 in the first end of the extrudate and a second fitting 464a connected to a second profile 460 in a second end of the extrudate. In certain applications, the profiles 458, 460 may be tubes.

Figure 14:
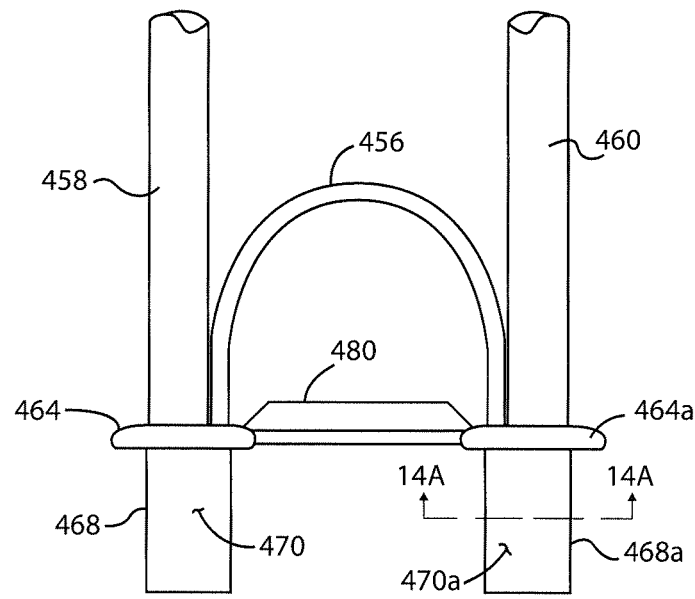
FIG. 14 is a side view of coupled fittings for use with the reservoir of FIG. 13.
Figure 14A:
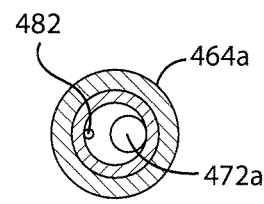
FIG. 14A is a partial cross sectional view of the fitting of FIG. 14.
Figure 15:
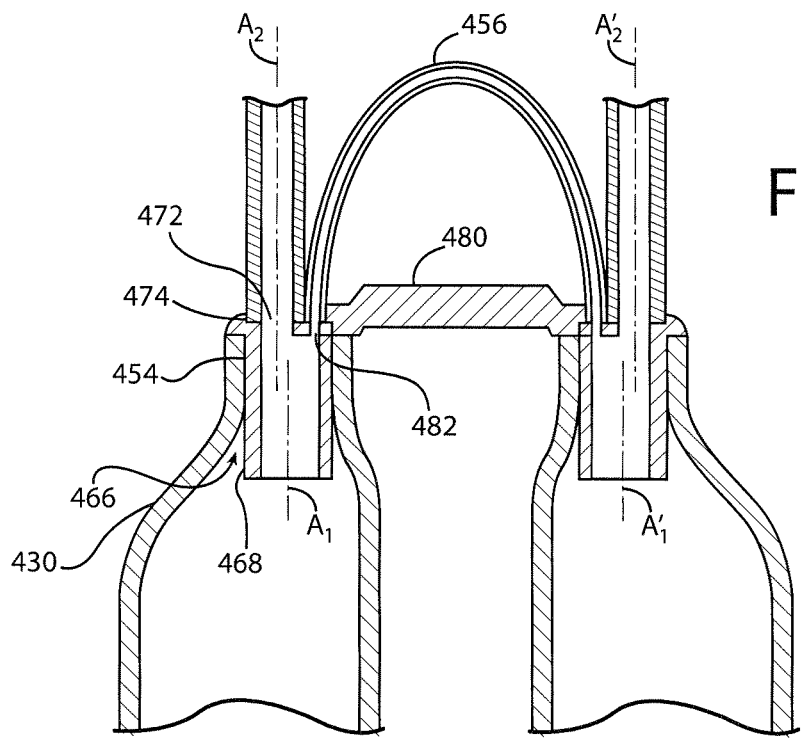
FIG. 15 is a partial cross sectional view of the reservoir of FIG. 13 showing the vent tube connecting the ends of the reservoir.

The fitting 464 includes a body portion 468 with an outer surface 470 having a body circumference about an axis $A_1$ and a fluid passageway 472 there through. As shown in FIG. 15, the reservoir 400 may include a necked region 430 transitioning to the sealing region 454 connecting to the outer surface 470 of the body portion 468. For certain applications such as water reservoirs, the bond between the fitting and the extrudate is a leak-proof bond. As shown in FIG. 15, a longitudinal axis $A_2$ of the profile 458 may be offset from the fitting body portion axis $A_1$. Similarly, the second fitting 464a includes a body portion 468a with an outer surface 470a having a body circumference about an axis $A_1'$ and a fluid passageway 472a there through. A longitudinal axis $A_2'$ of the profile 460 may be offset from the fitting body portion axis $A_1'$. In certain embodiments, the first fitting 464 and the second fitting 464a may be the same fitting. Alternatively, the first fitting 464 and the second fitting 464a may be mirror images of each other as shown in FIGS. 14 and 15. In other applications, the first fitting 464 and the second fitting 464a may have different geometry and/or different features as desired. In the example shown in FIGS. 14 and 15, the first fitting 464 and the second fitting 464a are connected together by a support member 480.

The reservoir 400 may include an air flow passageway 456 connected between the first fitting 464 and the second fitting 464a as shown in FIGS. 14 and 15. The first fitting includes a vent hole 482 in fluid communication with the one end of the air flow passageway 456, and the second fitting includes a vent hole 482a in fluid communication with the other end of the air flow passageway 456. The air flow passageway 456 may be connected to each fitting by overmolding at least a portion of the fitting body around an end of the tube forming the air flow passageway 456.

In the example shown in FIGS. 14 and 15, the first fitting 464 may be overmolded onto the first profile 458 and one end of the air flow passageway 456, and the second fitting 464a overmolded onto the second profile 460 and the other end of the air flow passageway 456 in an first and second fitting assembly. In the embodiment of FIGS. 14 and 15, the first and second fitting assembly may be made by at least partially inserting an end of the profile 458 and one end of the air flow passageway 456 into a split mold having a first portion of the cavity corresponding to the shape of the first fitting, and at least partially inserting an end of the profile 460 and other end of the air flow passageway 456 into the split mold having a second portion of the cavity corresponding to the shape of the second fitting. The first portion of the mold cavity and the second portion of the mold cavity may be connected by a cavity portion forming the support member 480. Then, injection overmolding the fittings onto the end of the profiles in the mold by injecting fluid polymer and filling the split mold cavity. During the overmolding process, a bond is formed in interfacial regions 474 between exterior surfaces of the profile ends and interior surfaces of the overmolded fittings as discussed above. For certain applications, the bond between the profiles 458, 460, 456 and overmolded fittings 464, 464a are material-to-material bonds.

The reservoir 400 may be made by the present process, in which an operator manually shapes the warm extrudate in the mold along a mold cavity having a desired reservoir shape, wherein the ends of the extrudate may, for certain applications, be adjacently positioned as shown for example in FIG. 13. After positioning of the extrudate, the operator inserts a first fitting 464 into a first end opening 466 of the extrudate and the second fitting 464a into the second end opening, where the inserted fittings are typically at a fitting temperature that is less than the extrudate temperature. The depth of the insertion and the shape of the mold cavity defines the sealing region 454 between the exterior surface of the inserted fitting with the interior surface of the extrudate. The mold is closed and at least a portion of the extrudate formed against the mold cavity by applying a means for forming to the extrudate to form the reservoir. As discussed above, the latent heat in the extrudate improves the formability of the extrudate material in the mold cavity and improves bonding between the fittings and the extrudate.

Therefore, what has been described above may be generalized as the ability to fabricate a plastic part by the combination of several processing technologies in sequence, namely extrusion followed by a combination of compression molding and Air-core® molding, the latter two methodologies being employed either essentially simultaneously or sequentially. In one embodiment, plastic profiles are extruded with subsequent insertion into a mold having a cavity of desired internal configuration. The heated and/or malleable extrudate is positioned in the mold followed by insertion of previously extruded profiles that are inserted into the beginning and end apertures of the main extrudate body. One end of an inserted profile is sealed while the remaining open end of the other inserted profile is connected to a pressurized source of gas. The mold is closed and pressure applied to expand the main extrudate body to fill the mold cavity. Through the application of heat and pressure about the sealing regions of the inserted profiles for an appropriate amount of time depending upon the thickness, composition and either latent heat of the main extrudate or applied heat in the mold, an essentially leak-proof seal may be effected. The pressure is released and reservoir assembly removed from the mold.

Alternatively, a process for making a reservoir comprises the steps of: positioning a hollow extrudate at a first temperature (essentially at the extrusion temperature of the extrudate or slightly below) having a profile into a mold with a cavity, the mold cavity having at least one cavity dimension that is larger than a corresponding dimension of the extrudate profile; the extrudate having a first and second opening, each opening positioned at an end of the extrudate; inserting one end of a hollow first polymeric profile at a second temperature (often approximately room temperature), the second temperature being less than the first temperature into the first opening of the extrudate, the end of the first profile being dimensionally smaller than the first opening of the extrudate; inserting one end of a hollow second polymeric profile at a third temperature (and often approximately room temperature), the third temperature being less than the first temperature into the second opening of the extrudate, the end of the second profile being dimensionally smaller than the second opening of said extrudate; sealing or affixing at least one source of pressurized gas to at least one non-inserted end of either the first or second profile; closing the mold and pressurizing said hollow extrudate by the application of pressure through at least one non-inserted end so that the hollow extrudate expands to fill said at least one cavity dimension through the application of internal pressure or external vacuum and form forming at least one expanded section in the extrudate and compressively seal an exterior surface of the two inserted ends of the first and second hollow profiles with an interior surface of said ends of the extrudate using the latent heat within the extrudate at the first temperature and forming a reservoir; releasing the pressure and/or vacuum; and removing the reservoir from said mold.

In yet another alternative, a process for making a reservoir comprises the steps of positioning a pliable hollow cylindrical extrudate into a mold with a cavity at an elevated temperature, said extrudate having a profile in cross-section, said cavity having at least one cavity dimension that is larger than a corresponding dimension of said extrudate profile; said extrudate having a first and second opening, each opening positioned at an end of said extrudate; affixing at least one source of pressurized gas to at least one of said first and second opening; closing said mold and pressurizing said hollow extrudate by the application of pressure through said at least one end so that said hollow extrudate expands to fill said at least one cavity dimension forming at least one expanded section in said extrudate, and forming said first opening to a desired internal opening diameter; releasing said pressure and removing said reservoir from said mold; crosslinking at least a portion of said extrudate to set the internal opening diameter of said extrudate and shape memory characteristics in said first opening; forcibly enlarging said first opening; inserting an end of a first connection profile into said enlarged first opening of said extrudate, said end of said first connection profile being dimensionally greater than said desired internal opening diameter and smaller than said enlarged first opening diameter of said extrudate; and applying an external or internal stimulus to said first opening to contract said opening compressively sealing an exterior surface of said first connection profile with an interior surface of said first end of said extrudate, thereby forming a reservoir, wherein said reservoir includes said connection profile.

The process may also include forming said second opening to a desired internal opening diameter, forcibly enlarging said second opening; inserting one end of a second connection profile into said second opening of said extrudate, said end of said second connection profile being dimensionally greater than said desired internal opening diameter and smaller than said enlarged second opening diameter of said extrudate; and applying an external or internal stimulus to said second opening to contract said opening compressively sealing an exterior surface of said second connection profile with an interior surface of said second end of the extrudate.

It should be recognized that while the positioning of the water reservoir has been illustrated to be essentially vertical in placement within the refrigeration unit, there is no need to limit the reservoir to this orientation. It is envisioned to be within the scope of this invention that any and all orientations and shapes that fit within the appropriate location of the desired application are within this invention. Reservoir orientation plays no role in this invention. It is also envisioned that the reservoir described hereinabove could be used for applications other than the transport of liquids, namely gaseous transport. When used for gases, filter material may optionally be included, e.g., molecular sieves, diatomaceous earth, etc.

In the foregoing description, certain terms have been used for brevity, clearness and understanding; but no unnecessary limitations are to be implied therefrom beyond the requirements of the prior art, because such terms are used for descriptive purposes and are intended to be broadly construed. Moreover, the description and illustration of the invention is by way of example, and the scope of the invention is not limited to the exact details shown or described. This invention has been described in detail with reference to specific embodiments thereof, including the respective best modes for carrying out each embodiment. It shall be understood that these illustrations are by way of example and not by way of limitation.

What is claimed is:

1. A process for joining an extrudate and a fitting comprising steps of:
    positioning at least a portion of a hollow extrudate at a first temperature having a polymeric extrudate profile into a split mold having a cavity,
    the extrudate having a first end opening at a first end and second end opening at a second end,
    inserting a first fitting into the first end opening and optionally a second fitting into the second end opening, each fitting being at a respective fitting temperature less than the first temperature,
    the first fitting and the optional second fitting each having a respective body portion with an outer surface having a body circumference about an axis, the first fitting having a passageway there through,
    sealing the outer surface of the first fitting body with an interior surface of the extrudate first end opening using latent heat within the extrudate, the first fitting passageway in fluid communication with the hollow interior of the extrudate, and if present, sealing the outer surface of the second fitting body with an interior surface of the extrudate second end opening using latent heat within the extrudate, removing the reservoir from the mold, the first fitting, and the second fitting, if present, sealed into the reservoir.

2. The process of claim 1 further comprising forming at least a portion of the extrudate by providing a source of pressurized gas to the interior of the hollow extrudate through the second end opening of the extrudate, the first end opening of the extrudate, or a combination thereof, closing the mold and pressurizing the hollow extrudate by applying pressurized gas to the interior of the extrudate forming the extrudate against the mold cavity.

3. The process of claim 1 further comprising forming at least a portion of the extrudate by providing a source of vacuum to an exterior surface of the extrudate through an interior surface of the mold cavity, closing the mold and drawing the hollow extrudate by applying vacuum to the exterior surface of the extrudate forming the extrudate against the mold cavity.

4. The process of claim 1 further comprising forming at least a portion of the extrudate by providing a source of pressurized gas to the interior of the hollow extrudate through the second end opening of the extrudate, the first end opening of the extrudate, or a combination thereof, providing a source of vacuum to an exterior surface of the extrudate through an interior surface of the mold cavity, closing the mold and selectively applying vacuum to the exterior surface of the extrudate and pressurizing the interior of the extrudate forming the extrudate against the mold cavity.

5. The process of claim 1 wherein the latent heat from the extrudate is sufficient to permit positioning of the hollow extrudate profile into the mold without the application of external heat.

6. The process of claim 1 wherein the first fitting body circumference and optionally the second fitting body circumference is smaller than a profile circumference of the extrudate.

7. The process of claim 1, where the first fitting includes a second profile connected to the first fitting.

8. The process of claim 7 wherein the second profile is a tube.

9. The process of claim 7 wherein a longitudinal axis of the second profile is offset from the first fitting body portion axis.

10. The process of claim 7 wherein a longitudinal axis of the second profile is transverse to the first fitting body portion axis.

11. The process of claim 7, prior to the step of inserting a first fitting, further comprising at least partially inserting an end of the second profile into a second split mold, and injection overmolding the first fitting onto the end of the second profile in the second split mold, an exterior surface of the second profile end and an interior surface of the overmolded first fitting forming a bond therebetween.

12. The process of claim 1, with the optional second fitting provided, and where the second fitting includes a third profile connected to the second fitting.

13. The process of claim 12 wherein the third profile is a tube.

14. The process of claim 12 wherein a longitudinal axis of the third profile is offset from the second fitting body portion axis.

15. The process of claim 12 wherein a longitudinal axis of the third profile is transverse to the second fitting body portion axis.

16. The process of claim 12, with the optional second fitting provided and prior to the step of inserting a second fitting, further comprising, at least partially inserting an end of the third profile into a third split mold, and injection overmolding the second fitting onto the end of the third profile in the third split mold, an exterior surface of the third profile end and an interior surface of the overmolded second fitting forming a bond therebetween.

17. The process of claim 1, with the optional second fitting provided, the second fitting having a passageway there through, wherein the first fitting and the second fitting are in fluid communication through a vent tube, a first end of the vent tube connected to the first fitting and a second end of the vent tube connected to the second fitting, each end of the vent tube in fluid communication with the hollow interior of the extrudate.

18. The process of claim 17 where the first end of the vent tube is overmolded into the first fitting and the second end of the vent tube is overmolded into the second fitting.

19. The process of claim 17 where the ends of the extrudate are adjacently positioned.

20. The process of claim 1, further comprising a step of crosslinking the extrudate.

* * * * *